(12) United States Patent
Faynor

(10) Patent No.: US 9,171,236 B1
(45) Date of Patent: Oct. 27, 2015

(54) DYNAMIC SPOOLER LOAD BALANCING

(71) Applicant: Xerox Corporation, Norwalk, CT (US)

(72) Inventor: John J. Faynor, Pittsford, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 14/273,928

(22) Filed: May 9, 2014

(51) Int. Cl.
 *G06F 3/12* (2006.01)
 *G06K 15/02* (2006.01)
(52) U.S. Cl.
 CPC .................................. *G06K 15/1806* (2013.01)
(58) Field of Classification Search
 None
 See application file for complete search history.

(56) References Cited

U.S. PATENT DOCUMENTS

| | | | |
|---|---|---|---|
| 5,602,974 A | 2/1997 | Shaw et al. | |
| 5,859,711 A * | 1/1999 | Barry et al. | 358/296 |
| 6,633,396 B1 | 10/2003 | Barry et al. | |
| 7,170,617 B1 | 1/2007 | Harrison et al. | |
| 7,190,477 B2 | 3/2007 | Ferlitsch | |
| 7,548,335 B2 * | 6/2009 | Lawrence et al. | 358/1.15 |
| 8,432,405 B2 | 4/2013 | Saini et al. | |
| 2005/0179936 A1 | 8/2005 | Sedky et al. | |
| 2005/0275875 A1 * | 12/2005 | Jennings, Jr. | 358/1.15 |
| 2006/0193006 A1 * | 8/2006 | Lawrence et al. | 358/1.16 |
| 2010/0091318 A1 * | 4/2010 | Ferlitsch | 358/1.15 |
| 2013/0042131 A1 | 2/2013 | Berry | |

* cited by examiner

*Primary Examiner* — Marcus T Riley
(74) *Attorney, Agent, or Firm* — Gibb & Riley, LLC

(57) ABSTRACT

Methods and systems monitor print data being retrieved by a dedicated spooler of a printing device, and monitor the quantity of print data within the print queue to be printed by a printing engine of the printing device. The dedicated spooler and the printing engine share computing resources and, therefore, the processing activities of the dedicated spooler slow processing activities of the printing engine. These methods and systems dynamically reduce the rate at which the print data is retrieved by the dedicated spooler based on the quantity of documents within the print queue to increase printing speed (for example, these methods and systems can reduce the rate at which the print data is retrieved by the dedicated spooler based on the quantity of print data within the print queue being above a threshold amount).

20 Claims, 4 Drawing Sheets

DYNAMIC SPOOLER LOAD BALANCING

BACKGROUND

Systems and methods herein generally relate to print spoolers and more particularly to a spooler having dynamic load balancing.

In print spooling, documents formatted for printing are stored and later retrieved by a printer at the printer's own rate. With spooling, multiple processes can write documents to a print queue without waiting. As soon as the spooler retrieves a document from a process, the process can perform other tasks, while a separate printing process operates the printer.

Without spooling, a word processor would be unable to continue until printing finished. Spooler or print management software allows priorities to be assigned to jobs, notifies users when their output has been printed, distributes jobs among several printers, allows forms or paper to be changed (or selects such automatically), generates banner pages to identify and separate print jobs, etc. A batch processing system uses spooling to maintain a queue of ready-to-run jobs that can be started as soon as the system has the resources to process them.

SUMMARY

Exemplary methods herein monitor print data being retrieved into a print queue of a printing device by a dedicated spooler of the printing device, and monitor the quantity of print data within the print queue to be printed by a printing engine of the printing device. The dedicated spooler and the printing engine share computing resources and, therefore, the processing activities of the dedicated spooler slow processing activities of the printing engine. In view of this, the methods herein intentionally slow the activities of the dedicated spooler when a reduced data retrieval rate of the spooler will not result in an insufficient amount of work for the printing engine to perform (will not result in starvation of print jobs for the printing engine to print) so as to free up computing resources to allow the printing engine to operate at a higher speed.

More specifically, these methods dynamically reduce the rate at which the print data is retrieved by the dedicated spooler based on the quantity of print data within the print queue (for example, such methods can reduce the rate at which the print data is retrieved by the dedicated spooler based on the quantity of print data (and/or number of documents) within the print queue being above a threshold amount.

In one example, the rate at which the print data is retrieved by the dedicated spooler can be reduced to some fraction of the maximum data retrieval rate of the dedicated spooler until the quantity of print data within the print queue drops below the threshold amount. Similarly, these methods can determine the number of documents within the print queue, and the rate at which the print data is retrieved by the dedicated spooler can be reduced to some percentage or fraction (less than 100%) of the maximum data retrieval rate of the dedicated spooler based on the number of documents being above a threshold number.

Regarding the fraction of the maximum data retrieval rate, such processing can reduce the data retrieval rate of the spooler to 75%, 50%, 25%, etc., of the maximum data retrieval rate. Additionally, the "maximum" data retrieval rate will vary from spooler to spooler (and from system to system) based upon the performance capabilities of various spoolers and various systems, but comprises a data retrieval rate that occurs when the spooler is operating at full power and with all required resources available at the spooler's disposal (and the maximum data retrieval rate is a data retrieval rate that cannot be exceeded by the spooler under any circumstances).

Additionally, the fraction of the maximum data retrieval rate to which the spooler is reduced can dynamically vary based upon the quantity of print data within the print queue or upon the number of documents contained within the print queue. For example, if a first quantity of print data (or first number of documents) is within the print queue, the methods herein may reduce the data retrieval rate to 50% of the maximum data retrieval rate. However, if a second (greater, for example) quantity of print data (or second number of documents) is within the print queue, the methods herein may reduce the data retrieval rate to 25% of the maximum data retrieval rate. In this way, the methods herein dynamically reduce the rate at which the print data is retrieved by the dedicated spooler based upon the quantity of data within the print queue.

Various printing devices include, among other elements: a tangible processor operating a dedicated spooler; a tangible, non-transitory computer storage medium operatively connected to the tangible processor; a printing engine operatively connected to the processor; etc. For example, the tangible, non-transitory computer storage medium can maintain a print queue and the dedicated spooler retrieves print data into the print queue for printing by the printing engine.

The spooler described herein comprises a "dedicated" spooler indicating that the spooler is not a component of a separate device, but instead is a local component of the printing device itself and is integral with the other components that make up the printing device. Therefore, the processor, memory, power supply, etc., that is used to operate the spooler can be the same processor, memory, power supply, etc., that performs the processing operations to run the printing engine. In other words, the dedicated spooler and the printing engine share computing resources of the processor. Thus, the processing activities of the dedicated spooler can slow the processing activities of the printing engine. In view of this, the methods and devices herein intentionally slow the activities of the dedicated spooler when the reduced data retrieval rate of the spooler will not result in an insufficient amount of work for the printing engine to perform (will not result in starvation of print jobs available for the printing engine to print) so as to free up computing resources to allow the printing engine to operate at a higher speed.

More specifically with printing devices herein, the processor monitors print data being retrieved by the dedicated spooler and monitors the quantity of print data (or quantity of documents) within the print queue to be printed by the printing engine. Then, the processor dynamically reduces the rate at which the print data is retrieved by the dedicated spooler based on the quantity of documents within the print queue, as described above.

These and other features are described in, or are apparent from, the following detailed description.

BRIEF DESCRIPTION OF THE DRAWINGS

Various exemplary systems and methods are described in detail below, with reference to the attached drawing figures, in which.

DETAILED DESCRIPTION

Figure 1:
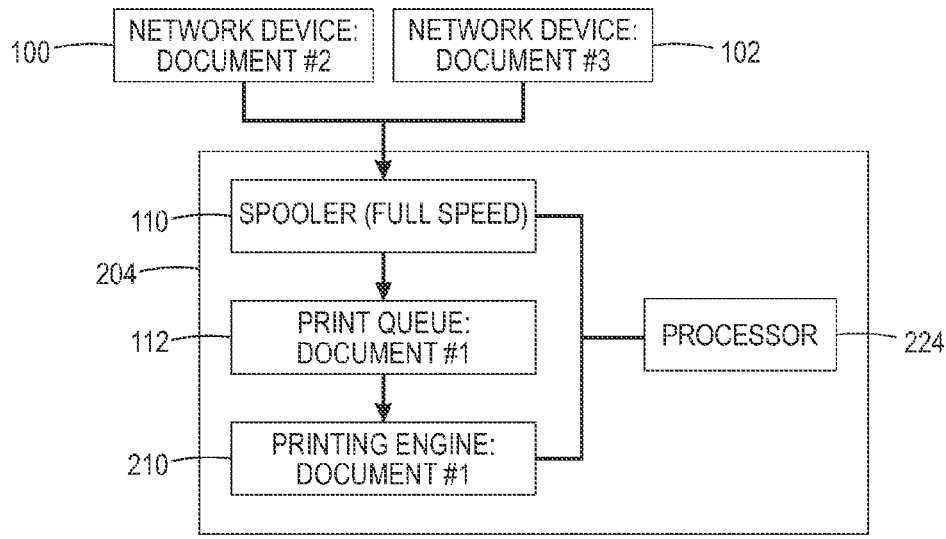
FIG. 1 is a schematic diagram of various methods herein.

It has been determined that when a printer is actively spooling incoming documents (e.g., retrieving image data off the network), the marking speed of the printer can slow down. As soon as the spooling of incoming documents completes, the marking speed of the current marking document increases. The overall effect is slower print performance than expected while spooling. Not all documents, or test scenarios cause this problem, but many do.

Therefore, the systems and methods herein provide a mechanism by which the print performance of the machine can be improved by dynamically controlling how fast documents are spooled off the network onto the device. The methods and devices herein use feedback mechanisms to indicate when to slow down spooling and when to speed up spooling. When there is a surplus of documents or images spooled ahead, then the methods and devices herein reduce the speed at which new documents are spooled off the network. When the surplus of documents or images spooled is low, the methods and devices herein increase the speed at which documents are spooled of the network. Overall, the net effect of this is to smooth out the impact of spooling new documents over a larger period of time, thus improving print performance.

Generally, printing devices spool to memory (with options), do not spool, or provide user setting as to whether the printer is to spool or not. When spooling, the trade off is performance vs. first page out time (FPOT). With no spooling, the tradeoff is feature functionality such as, job recovery, job repurposing, etc.; however, with no spooling, the first page out time is less. Therefore, with methods and devices herein, the lower first page out time associated with no spooling is achieved, without sacrificing functionality. Thus, methods and devices herein provide the benefits of spooling with much less impact on performance.

In one example, a 26-page medium complexity job completely spools by the time the $6^{th}$ page is marked. In other words, spooling is occurring simultaneously while the first pages of the job are printing, especially with jobs of significant spool size. During the marking of the first 6 pages, they print 40% slower than the remaining 20 pgs. To reduce or prevent such printing delay, these methods dynamically reduce the rate at which the print data is retrieved by the spooler based on the quantity of print data within the print queue.

In some examples, if the number of jobs in the queue is 1 or less, then the methods and devices herein spool at full rate; if the number of jobs in the queue is 2 or more, then the methods and devices herein spool at ½ the full rate; if the number of jobs in the queue is 4 or more, then the methods and devices herein spool at ¼ the full rate; etc.

Therefore, the methods and devices herein spread out the impact of spooling over much more of the jobs, instead of spooling all jobs as fast possible and unnecessarily taking processing resources that cause the printing engine to run slower until the spooling completes. By doing so, the methods and devices herein provide improved print performance, provide more competitive machines, exhibit a more efficient use of the central processor, etc.

Figure 2:
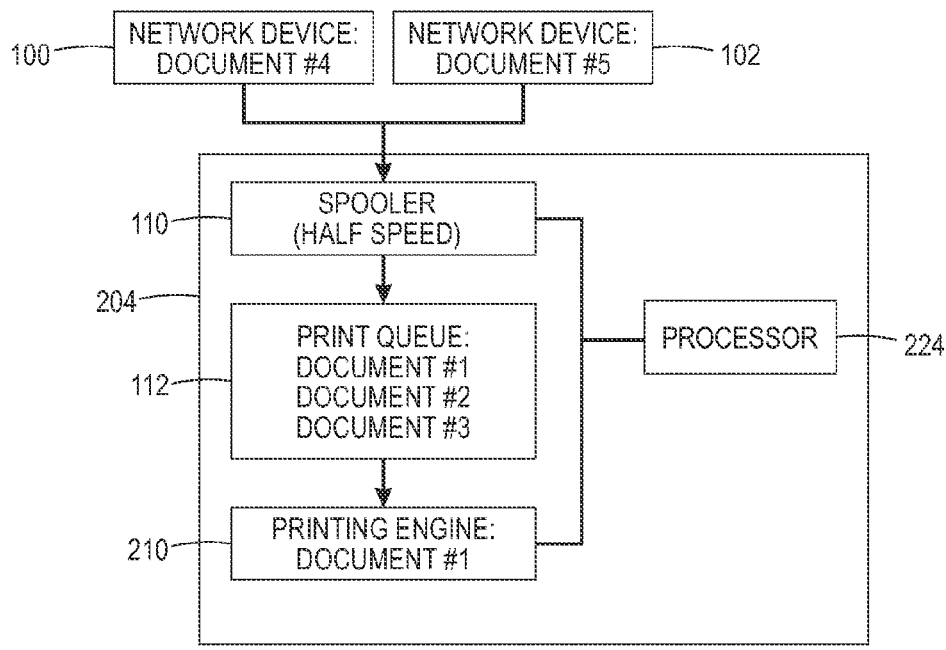
FIG. 2 is a schematic diagram of various methods herein.

FIGS. 1 and 2 are schematic diagrams illustrating various network devices 100, 102 generating print jobs, printing device 204 (more details of which are discussed below with respect to FIG. 6), a spooler 110, a print queue 112, a printing engine 210, and a processor 224 (again, discussed below). Note that in FIGS. 1 and 2, the processor 224 is shared by the spooler 110 and the print engine 210. Therefore, the processor 224 is described herein as a "shared" processor, and the spooler 110 is described herein as a "dedicated" spooler, indicating that the spooler is not a component of a separate device, but instead is a local dedicated component of the printing device itself and is integral with the other components that make up the printing device. Thus, the spooler 110 and the printing engine 210 share computing resources of the processor 224, and the processing activities of the spooler 110 can slow the processing activities of the printing engine 210.

As shown in FIG. 1, the spooler 110 retrieves various print jobs (identified as Document #1, Document #2, Document #3, etc., in FIGS. 1 and 2) from the network devices 100, 102, and this process of spooling such jobs into the print queue 112 consumes resources of the processor 224 (slowing operation of the printing engine 210 as the printing engine 210 prints the top priority document in the print queue, Document #1).

In FIG. 1, because there is only a small amount of print data within the print queue 112, to avoid an insufficient amount of work being provided to the printing engine 210 (to avoid starvation of print jobs available for the printing engine 210 to print), the spooler 100 operates at full speed consuming a first amount of computational resources of the processor 224. To the contrary, as shown in FIG. 2, there is a relatively larger amount of print data within the print queue 112 (Documents #1-3) previously retrieved from the network devices 100, 102 compared to the situation shown in FIG. 1.

Therefore, the systems and methods herein determine that there is a relatively larger buffer of printing work for the printing engine 210 to perform, and these systems and methods slow the print data retrieval operation of the spooler 110 to half speed. This reduction in the print data retrieval speed of the spooler 110 frees up computing resources to allow the printing engine 210 to operate at a higher speed (e.g., consumes a second amount of computational resources of the processor 224, which is less than the first amount consumed in FIG. 1). Further, with methods and devices herein, the data retrieval rate of the spooler 110 is constantly and dynamically changed as the amount of print data maintained within the spooler 110 constantly and dynamically changes. As less print data is in the print queue 112, the data retrieval rate of the spooler 110 increases; and, as more print data is in the print queue 112, the data retrieval rate of the spooler 110 decreases (in increments or in continual proportional changes).

Figure 3:
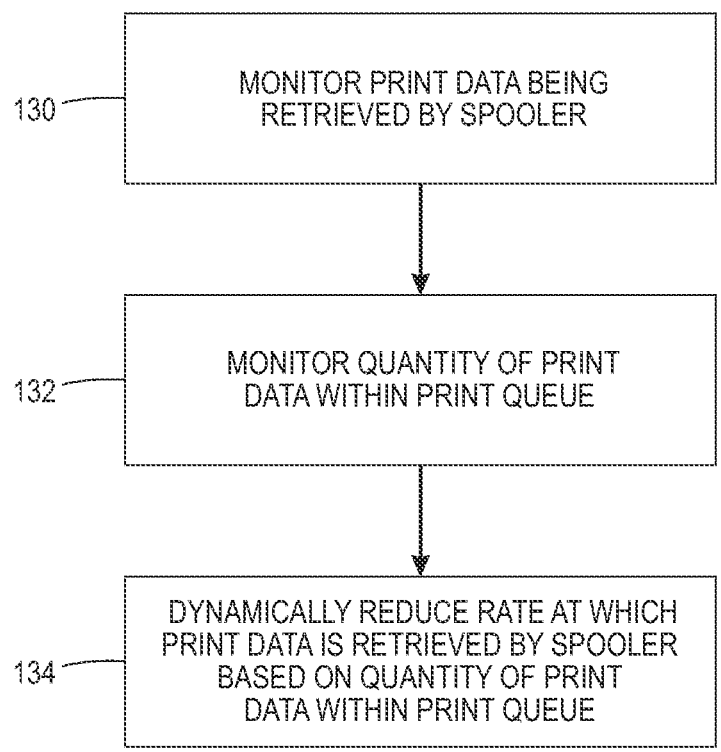
FIG. 3 is a flow diagram of various methods herein.

FIG. 3 is flowchart illustrating exemplary methods herein. In item 130, these methods automatically monitor print data being retrieved into a print queue of a printing device by a dedicated spooler of the printing device and, in item 132, automatically monitor the quantity of print data within the print queue to be printed by a printing engine of the printing device. The dedicated spooler and the printing engine share computing resources and, therefore, the processing activities of the dedicated spooler slow processing activities of the printing engine. In view of this, the methods herein intentionally slow the activities of the dedicated spooler when a reduced data retrieval rate of the spooler will not result in an insufficient amount of work for the printing engine to perform (will not result in starvation of print jobs for the printing engine to print) so as to free up computing resources to allow the printing engine to operate at a higher speed.

More specifically, as shown in item 134, these methods automatically dynamically reduce the rate at which the print data is retrieved by the dedicated spooler based on the dynamic quantity of print data within the print queue. For example, such methods can automatically reduce the rate at which the print data is retrieved by the dedicated spooler based on the quantity of print data (or number of documents) within the print queue being above a threshold amount (and reduce the rate until the quantity of print data within the print queue drops below the threshold amount, at which time the rate in increased to standard rate until, again, the print data goes above the threshold amount, etc.).

In one example, the rate at which the print data is retrieved by the dedicated spooler can be reduced by determining the amount of time it will take for the printing engine to print the quantity of print data within the print queue, and the rate at which the print data is retrieved by the dedicated spooler can be reduced to some fraction of the maximum data retrieval rate of the dedicated spooler for that amount of time. Similarly, these methods can determine the number of documents within the print queue, and the rate at which the print data is retrieved by the dedicated spooler can be reduced to some percentage or fraction (less than 100%) of the maximum data retrieval rate of the dedicated spooler based on the number of documents being above a threshold number.

Regarding the fraction of the maximum data retrieval rate, such processing can reduce the data retrieval rate of the spooler to, for example, 75%, 50%, 25%, etc., of the maximum data retrieval rate (in smooth continuous changes, or in increments). Additionally, the "maximum" data retrieval rate will vary from spooler to spooler (and from system to system) based upon the performance capabilities of various spoolers and various systems, but comprises a data retrieval rate that occurs when the spooler is operating at full power and with all required resources available at the spooler's disposal (and the maximum data retrieval rate is a data retrieval rate that cannot be exceeded by the spooler under any circumstances).

Additionally, the fraction of the maximum data retrieval rate to which the spooler is reduced can dynamically vary based upon the quantity of print data within the print queue or upon the number of documents contained within the print queue. For example, if a first quantity of print data (or first number of documents) is within the print queue, the methods herein may reduce the data retrieval rate to 50% of the maximum data retrieval rate. However, if a second (greater, for example) quantity of print data (or second number of documents) is within the print queue, the methods herein may reduce the data retrieval rate to 25% of the maximum data retrieval rate. In this way, the methods herein dynamically reduce the rate at which the print data is retrieved by the dedicated spooler based upon the quantity of data within the print queue.

Figure 4:
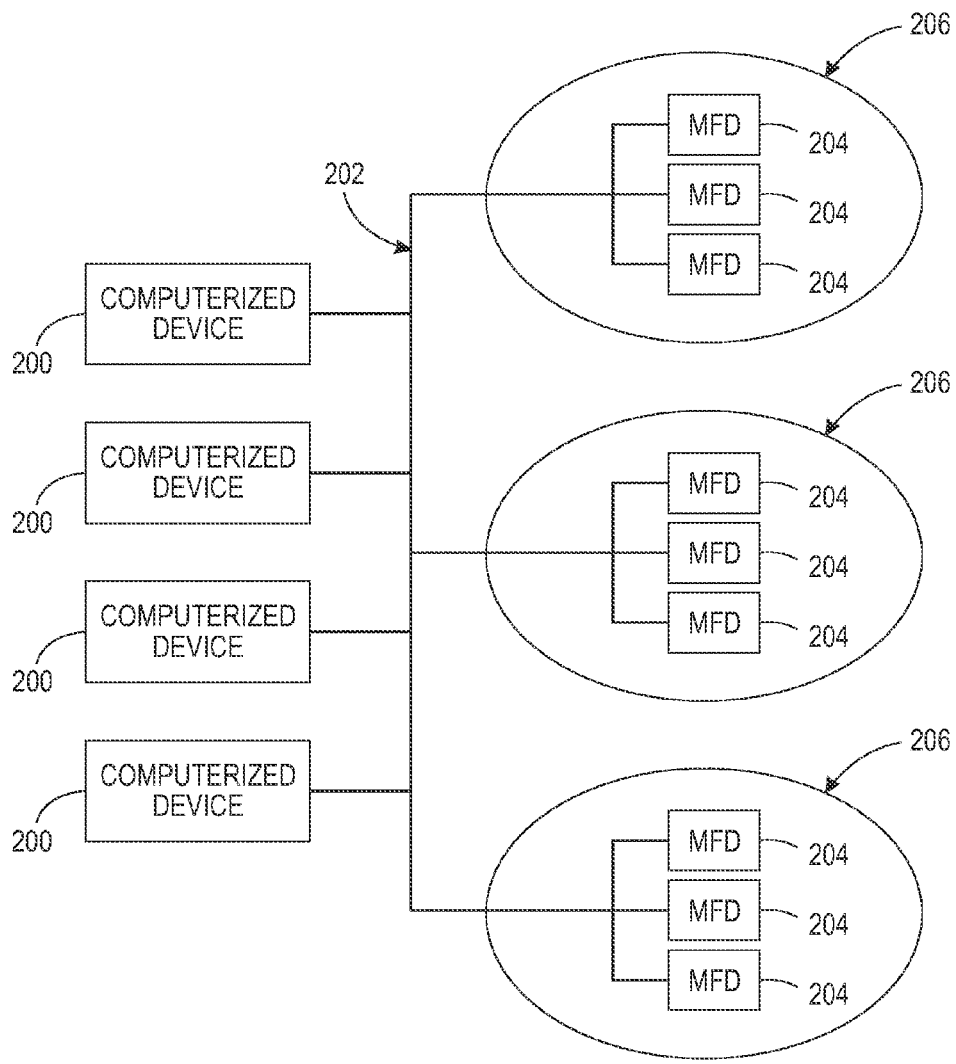
FIG. 4 is a schematic diagram illustrating systems herein.

As shown in FIG. 4, exemplary systems and methods herein include various computerized devices 200, 204 located at various different physical locations 206. The computerized devices 200, 204 can include print servers, printing devices, personal computers, etc., and are in communication (operatively connected to one another) by way of a local or wide area (wired or wireless) network 202.

Figure 5:
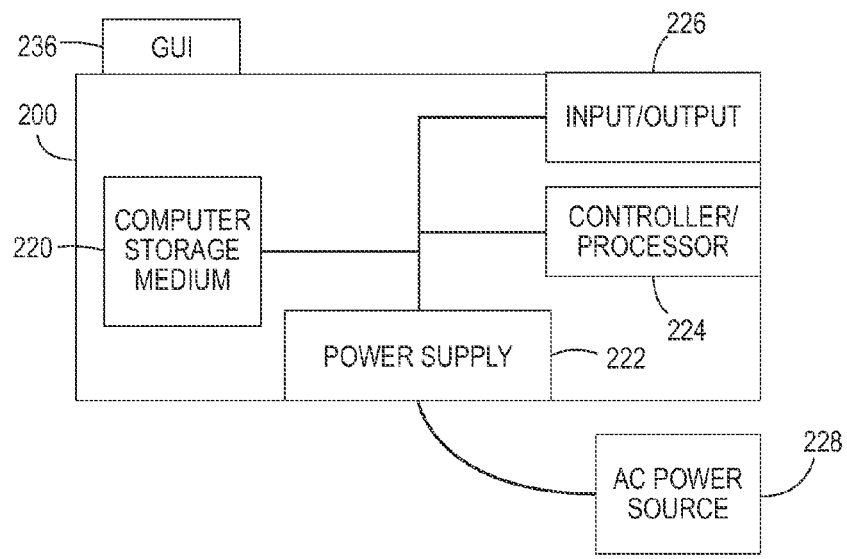
FIG. 5 is a schematic diagram illustrating devices herein.

FIG. 5 illustrates a computerized device 200, which can be used with systems and methods herein and can comprise, for example, a print server, a personal computer, a portable computing device, etc. The computerized device 200 includes a controller/tangible processor 224 and a communications port (input/output) 226 operatively connected to the tangible processor 224 and to the computerized network 202 external to the computerized device 200. Also, the computerized device 200 can include at least one accessory functional component, such as a graphic user interface assembly 236 that also operate on the power supplied from the external power source 228 (through the power supply 222).

The input/output device 226 is used for communications to and from the computerized device 200. The tangible processor 224 controls the various actions of the computerized device. A non-transitory computer storage medium device 220 (which can be optical, magnetic, capacitor based, etc.) is readable by the tangible processor 224 and stores instructions that the tangible processor 224 executes to allow the computerized device to perform its various functions, such as those described herein. Thus, as shown in FIG. 5, a body housing has one or more functional components that operate on power supplied from an alternating current (AC) source 228 by the power supply 222. The power supply 222 can comprise a power storage element (e.g., a battery, etc).

Figure 6:
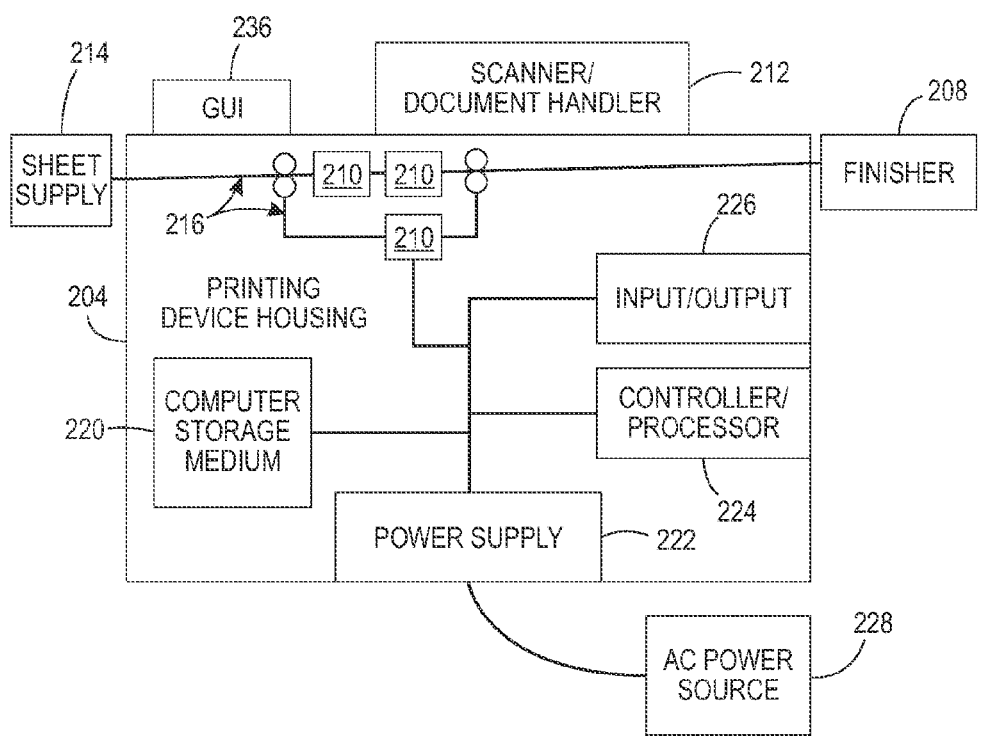
FIG. 6 is a schematic diagram illustrating devices herein.

FIG. 6 illustrates a computerized device that is a printing device 204, which can be used with systems and methods herein and can comprise, for example, a printer, copier, multi-function machine, multi-function device (MFD), etc. The printing device 204 includes many of the components mentioned above and at least one marking device (printing engines) 210 operatively connected to the tangible processor 224, a media path 216 positioned to supply sheets of media from a sheet supply 214 to the marking device(s) 210, etc. After receiving various markings from the printing engine(s), the sheets of media can optionally pass to a finisher 208 which can fold, staple, sort, etc., the various printed sheets. Also, the printing device 204 can include at least one accessory functional component (such as a scanner/document handler 212, etc.) that also operates on the power supplied from the external power source 228 (through the power supply 222).

For example, the tangible, non-transitory computer storage medium 220 can maintain a print queue, and the dedicated spooler operated by the processor 224 can retrieves print data into the print queue for printing by the printing engine 210. The spooler described herein comprises a "dedicated" spooler indicating that the spooler is not a component of a separate device, but instead is a local component of the printing device itself and is integral with the other components that make up the printing device. Therefore, the processor 224, memory 220, power supply 222, etc., that is used to operate the spooler can be the same processor 224, memory 220, power supply 222, etc., that performs the processing operations to run the printing engine 210. In other words, the dedicated spooler and the printing engine 210 share computing resources. Thus, the processing activities of the dedicated spooler can slow the processing activities of the printing engine 210. In view of this, the methods and devices herein intentionally slow the activities of the dedicated spooler when the reduced data retrieval rate of the spooler will not result in an insufficient amount of work for the printing engine 210 to perform (will not result in starvation of print jobs for the printing engine 210 to print) so as to free up computing resources to allow the printing engine 210 to operate at a higher speed.

More specifically with printing devices herein, the processor 224 monitors print data being retrieved into a print queue of a printing device by the dedicated spooler and monitors the quantity of print data (or quantity of documents) within the print queue to be printed by the printing engine 210. Then, the processor 224 dynamically reduces the rate at which the print data is retrieved by the dedicated spooler based on the quantity of documents within the print queue, as described above.

As would be understood by those ordinarily skilled in the art, the printing device 204 shown in FIG. 6 is only one example and the systems and methods herein are equally applicable to other types of printing devices that may include fewer components or more components. For example, while a limited number of printing engines and paper paths are illustrated in FIG. 6, those ordinarily skilled in the art would understand that many more paper paths and additional printing engines could be included within any printing device used with systems and methods herein.

While some exemplary structures are illustrated in the attached drawings, those ordinarily skilled in the art would understand that the drawings are simplified schematic illustrations and that the claims presented below encompass many more features that are not illustrated (or potentially many less) but that are commonly utilized with such devices and systems. Therefore, Applicants do not intend for the claims presented below to be limited by the attached drawings, but instead the attached drawings are merely provided to illustrate a few ways in which the claimed features can be implemented.

Many computerized devices are discussed above. Computerized devices that include chip-based central processing units (CPU's), input/output devices (including graphic user interfaces (GUI), memories, comparators, tangible processors, etc.) are well-known and readily available devices produced by manufacturers such as Dell Computers, Round Rock Tex., USA and Apple Computer Co., Cupertino Calif., USA. Such computerized devices commonly include input/output devices, power supplies, tangible processors, electronic storage memories, wiring, etc., the details of which are omitted herefrom to allow the reader to focus on the salient aspects of the systems and methods described herein. Similarly, scanners and other similar peripheral equipment are available from Xerox Corporation, Norwalk, Conn., USA and the details of such devices are not discussed herein for purposes of brevity and reader focus.

The terms printer or printing device as used herein encompasses any apparatus, such as a digital copier, bookmaking machine, facsimile machine, multi-function machine, etc., which performs a print outputting function for any purpose. The details of printers, printing engines, etc., are well-known and are not described in detail herein to keep this disclosure focused on the salient features presented. The systems and methods herein can encompass systems and methods that print in color, monochrome, or handle color or monochrome image data. All foregoing systems and methods are specifically applicable to electrostatographic and/or xerographic machines and/or processes. Further, the terms automated or automatically mean that once a process is started (by a machine or a user), one or more machines perform the process without further input from any user.

It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. Unless specifically defined in a specific claim itself, steps or components of the systems and methods herein cannot be implied or imported from any above example as limitations to any particular order, number, position, size, shape, angle, color, or material.

What is claimed is:

1. A method comprising:
    monitoring print data being retrieved into a print queue of a printing device by a dedicated spooler of said printing device;
    monitoring a quantity of print data within said print queue to be printed by a printing engine of said printing device, said dedicated spooler and said printing engine sharing computing resources; and
    reducing a rate at which said print data is retrieved by said dedicated spooler to a percentage, less than 100%, of a maximum data retrieval rate of said dedicated spooler based on said quantity of print data within said print queue being above a threshold amount.

2. The method according to claim 1, said reducing said rate at which said print data is retrieved by said dedicated spooler comprising:
    reducing said rate at which said print data is retrieved by said dedicated spooler to a percentage, less than 100%, of said maximum data retrieval rate of said dedicated spooler until said quantity of print data within said print queue is below said threshold amount.

3. The method according to claim 1, said reducing said rate at which said print data is retrieved by said dedicated spooler comprising:
    determining a number of documents within said print queue; and
    reducing said rate at which said print data is retrieved by said dedicated spooler to a percentage, less than 100%, of said maximum data retrieval rate of said dedicated spooler based on said number of documents being above a first number.

4. The method according to claim 3, said reducing said rate at which said print data is retrieved by said dedicated spooler further comprising:
    reducing said rate at which said print data is retrieved by said dedicated spooler by at least one-quarter said maximum data retrieval rate of said dedicated spooler based on said number of documents being above a second number,
    said second number being greater than said first number.

5. The method according to claim 1, processing activities of said dedicated spooler slowing processing activities of said printing engine.

6. A method comprising:
    monitoring print data being retrieved into a print queue of a printing device by a dedicated spooler of said printing device;
    monitoring a quantity of print data within said print queue to be printed by a printing engine of said printing device, said dedicated spooler and said printing engine sharing computing resources; and
    dynamically reducing a rate at which said print data is retrieved by said dedicated spooler to a percentage, less than 100%, of a maximum data retrieval rate of said dedicated spooler based on said quantity of print data within said print queue.

7. The method according to claim 6, said reducing said rate at which said print data is retrieved by said dedicated spooler comprising:
    reducing said rate at which said print data is retrieved by said dedicated spooler to a percentage, less than 100%, of said maximum data retrieval rate of said dedicated spooler until said quantity of print data within said print queue is below a threshold amount.

8. The method according to claim 6, said reducing said rate at which said print data is retrieved by said dedicated spooler comprising:
    determining a number of documents within said print queue; and
    reducing said rate at which said print data is retrieved by said dedicated spooler to a percentage, less than 100%, of said maximum data retrieval rate of said dedicated spooler based on said number of documents being above a first number.

9. The method according to claim 8, said reducing said rate at which said print data is retrieved by said dedicated spooler further comprising:

reducing said rate at which said print data is retrieved by said dedicated spooler by at least one-quarter said maximum data retrieval rate of said dedicated spooler based on said number of documents being above a second number, said second number being greater than said first number.

10. The method according to claim 6, processing activities of said dedicated spooler slowing processing activities of said printing engine.

11. A printing device comprising:

a tangible processor operating a dedicated spooler;

a tangible, non-transitory computer storage medium operatively connected to said tangible processor, said tangible, non-transitory computer storage medium maintaining a print queue; and a printing engine operatively connected to said processor, said dedicated spooler retrieving print data into said print queue for printing by said printing engine, said dedicated spooler and said printing engine sharing computing resources of said processor, said processor monitoring said print data being retrieved into said print queue by said dedicated spooler, said processor monitoring a quantity of print data within said print queue to be printed by said printing engine, and said processor reducing a rate at which said print data is retrieved by said dedicated spooler to a percentage, less than 100%, of a maximum data retrieval rate of said dedicated spooler based on said quantity of print data within said print queue being above a threshold amount.

12. The printing device according to claim 11, said processor reducing said rate at which said print data is retrieved by said dedicated spooler by:

reducing said rate at which said print data is retrieved by said dedicated spooler to a percentage, less than 100%, of said maximum data retrieval rate of said dedicated spooler until said quantity of print data within said print queue is below said threshold amount.

13. The printing device according to claim 11, said processor reducing said rate at which said print data is retrieved by said dedicated spooler by:

determining a number of documents within said print queue; and reducing said rate at which said print data is retrieved by said dedicated spooler to a percentage, less than 100%, of said maximum data retrieval rate of said dedicated spooler based on said number of documents being above a first number.

14. The printing device according to claim 13, said processor reducing said rate at which said print data is retrieved by said dedicated spooler further by:

reducing said rate at which said print data is retrieved by said dedicated spooler by at least one-quarter said maximum data retrieval rate of said dedicated spooler based on said number of documents being above a second number, said second number being greater than said first number.

15. The printing device according to claim 11, processing activities of said dedicated spooler slowing processing activities of said printing engine.

16. A printing device comprising:

a tangible processor operating a dedicated spooler;

a tangible, non-transitory computer storage medium operatively connected to said tangible processor, said tangible, non-transitory computer storage medium maintaining a print queue; and a printing engine operatively connected to said processor, said dedicated spooler retrieving print data into said print queue for printing by said printing engine, said dedicated spooler and said printing engine sharing computing resources of said processor, said processor monitoring said print data being retrieved into said print queue by said dedicated spooler, said processor monitoring a quantity of print data within said print queue to be printed by said printing engine, and said processor dynamically reducing a rate at which said print data is retrieved by said dedicated spooler to a percentage, less than 100%, of a maximum data retrieval rate of said dedicated spooler based on said quantity of print data within said print queue.

17. The printing device according to claim 16, said processor reducing said rate at which said print data is retrieved by said dedicated spooler by:

reducing said rate at which said print data is retrieved by said dedicated spooler to a percentage, less than 100%, of said maximum data retrieval rate of said dedicated spooler until said quantity of print data within said print queue is below a threshold amount.

18. The printing device according to claim 16, said processor reducing said rate at which said print data is retrieved by said dedicated spooler by:

determining a number of documents within said print queue; and reducing said rate at which said print data is retrieved by said dedicated spooler to a percentage, less than 100%, of said maximum data retrieval rate of said dedicated spooler based on said number of documents being above a first number.

19. The printing device according to claim 18, said processor reducing said rate at which said print data is retrieved by said dedicated spooler further by:

reducing said rate at which said print data is retrieved by said dedicated spooler by at least one-quarter said maximum data retrieval rate of said dedicated spooler based on said number of documents being above a second number, said second number being greater than said first number.

20. The printing device according to claim 16, processing activities of said dedicated spooler slowing processing activities of said printing engine.

* * * * *